United States Patent
Ouyang et al.

(10) Patent No.: US 8,602,567 B2
(45) Date of Patent: Dec. 10, 2013

(54) MULTIPLEXING LIGHT PIPE HAVING ENHANCED BRIGHTNESS

(75) Inventors: George Ouyang, Valencia, CA (US); Kenneth Li, Valencia, CA (US)

(73) Assignee: Wavien, Inc., Valencia, CA (US)

( * ) Notice: Subject to any disclaimer, the term of this patent is extended or adjusted under 35 U.S.C. 154(b) by 202 days.

(21) Appl. No.: 12/891,553

(22) Filed: Sep. 27, 2010

(65) Prior Publication Data

US 2011/0075105 A1    Mar. 31, 2011

Related U.S. Application Data

(60) Provisional application No. 61/246,698, filed on Sep. 29, 2009, provisional application No. 61/382,189, filed on Sep. 13, 2010.

(51) Int. Cl.
- *G03B 21/26*    (2006.01)
- *F21V 7/04*    (2006.01)
- *H01L 33/00*    (2010.01)

(52) U.S. Cl.
USPC .......................................... 353/94; 362/555

(58) Field of Classification Search
USPC ................... 362/551, 555, 231, 560; 359/629; 385/133, 901
See application file for complete search history.

(56) References Cited

U.S. PATENT DOCUMENTS

| | | |
|---|---|---|
| 6,795,243 B1 | 9/2004 | McGettigan et al. |
| 7,775,669 B2 * | 8/2010 | Liao et al. ................ 353/94 |
| 2003/0179977 A1 | 9/2003 | Li |
| 2005/0254018 A1 * | 11/2005 | Magarill et al. ............. 353/94 |
| 2007/0146639 A1 * | 6/2007 | Conner ........................ 353/20 |
| 2007/0291491 A1 * | 12/2007 | Li et al. ..................... 362/307 |
| 2008/0030984 A1 | 2/2008 | Harbers et al. |
| 2009/0128781 A1 | 5/2009 | Li |

OTHER PUBLICATIONS

International Search Report and Written Opinion issued for PCT/US2010/050538, dated Nov. 26, 2010, 10 pages.

* cited by examiner

*Primary Examiner* — William C Dowling
*Assistant Examiner* — Ryan Howard
(74) *Attorney, Agent, or Firm* — Abelman, Frayne & Schwab

(57) ABSTRACT

Multi-color light sources are mixed in a recycling housing to achieve high light output. Light from each color light source is multiplexed and a portion of the mixed light passes through an output aperture in the light pipe and a portion light is recycled back, for example, by a shaped reflective surface and/or a reflective coating adjacent the aperture. In one embodiment, the light is directed back from the output side of the housing to an input light source having the same color. In another embodiment, the light is directed back from the output side of the housing to a coating designed to reflect that color. The reflected light is then reflected back toward the output aperture and a portion of that reflected light is again reflected toward the input and impacts the original source for that color light. In this way, light theoretically recycles infinitely.

10 Claims, 5 Drawing Sheets

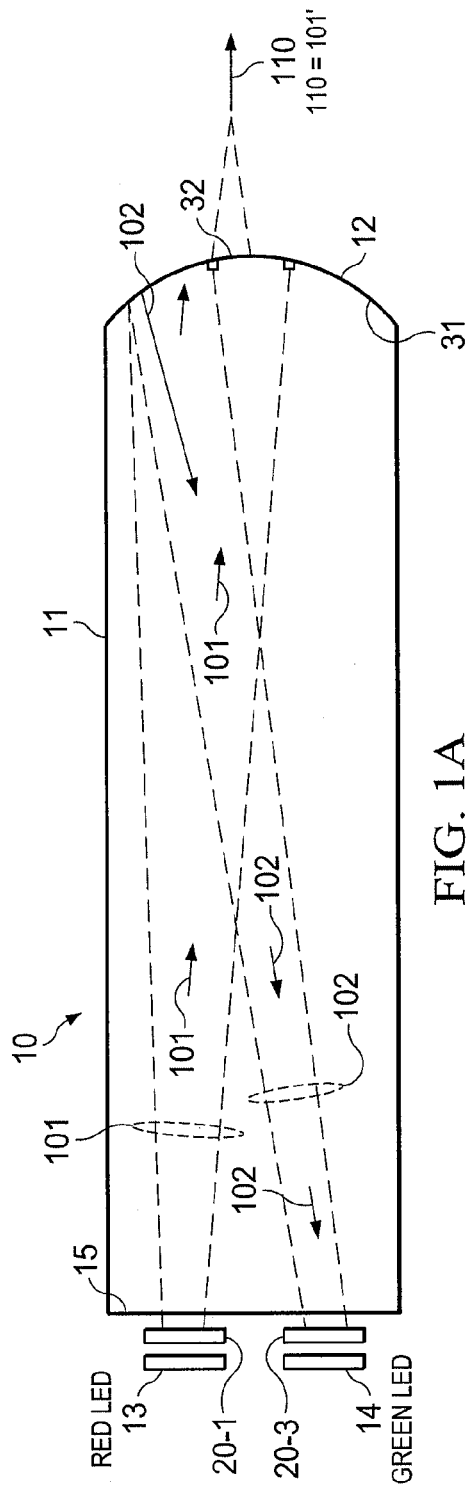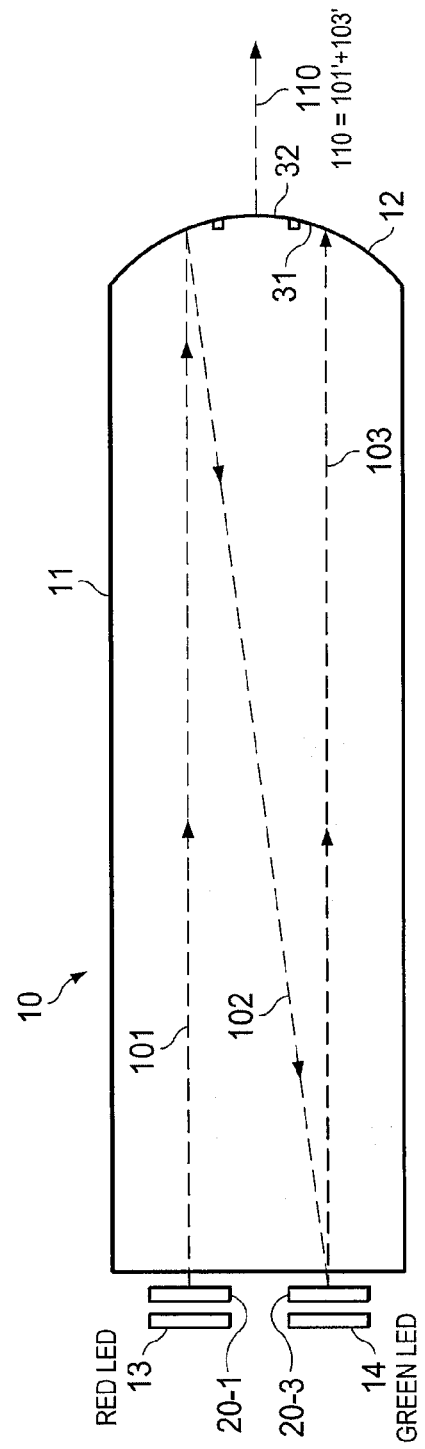
FIG. 1A
FIG. 1B

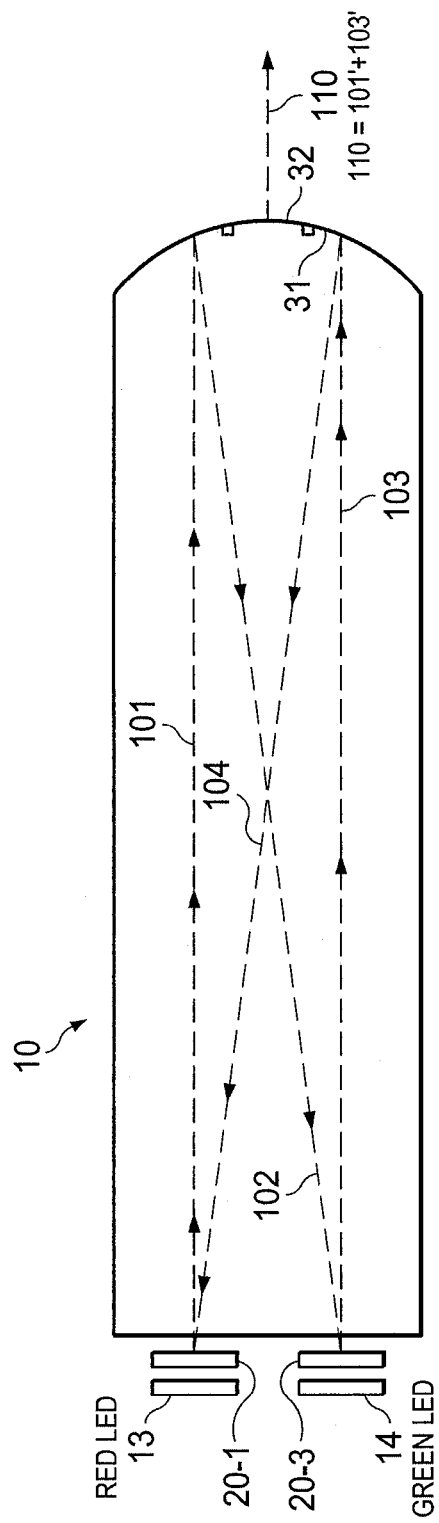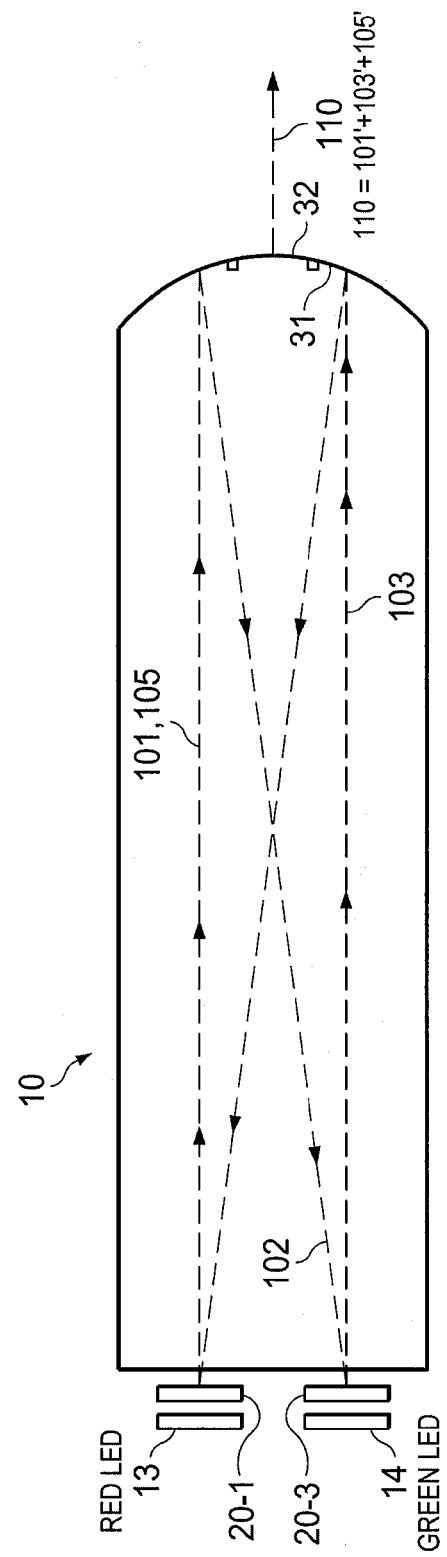

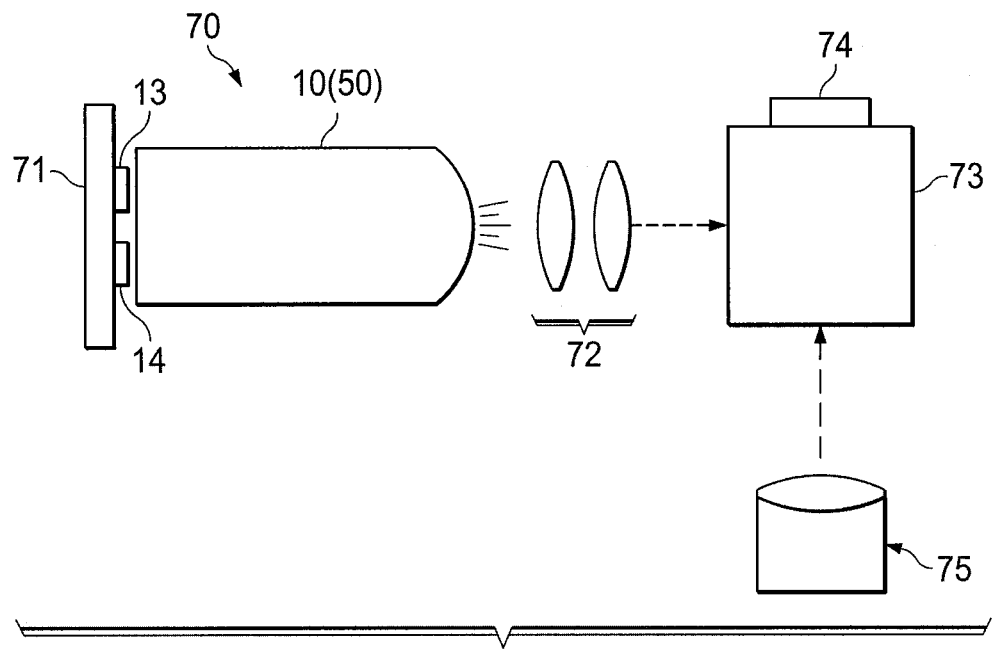

MULTIPLEXING LIGHT PIPE HAVING ENHANCED BRIGHTNESS

CROSS-REFERENCE TO RELATED APPLICATIONS

This application claims the benefit of U.S. Provisional Application Ser. No. 61/246,698 filed on Sep. 29, 2009, and U.S. Provisional Application Ser. No. 61/382,189 filed on Sep. 13, 2010, which are hereby incorporated by reference.

TECHNICAL FIELD

This disclosure relates to multiplexing light sources, and more particularly to systems and methods for utilizing light pipes to achieve increased light output of multiplexed LED or other light inputs.

BACKGROUND OF THE INVENTION

Some light systems, for example, projection systems, require a high light output. Light output, measured in lumens typically needs to be in the range of 1500 to 2500 ANSI lumens for small systems in low ambient light; 2500 to 4000 ANSI lumens for medium applications with higher light, and over 4000 ANSI lumens for large rooms with no light control. There has been great advancement in LED development, see, for example, commonly assigned co-pending U.S. patent application Ser. No. 12/542,341 and entitled "RECYCLING SYSTEM AND METHOD FOR INCREASING BRIGHTNESS USING LIGHT PIPES WITH ONE OR MORE LIGHT SOURCES, AND A PROJECTOR INCORPORATING THE SAME," filed Aug. 17, 2009, hereby incorporated by reference. However, when it is desired to mix (multiplex) light sources having different colors (typically LEDs having the primary colors RGB) the techniques presently used are either expensive or large in physical size. Thus, a need exists in the art for a device that allows for the economical mixing of colored light sources in a relatively small housing while still achieving sufficient light output to power devices, such as projector systems.

BRIEF SUMMARY OF THE INVENTION

Multi-color light sources are mixed in a recycling housing to achieve high light output. In one embodiment, the light from each color light source, such as from red, green and blue LEDs, is multiplexed together and a portion of the mixed light passes through an output aperture in the light pipe. A portion of each colored light is recycled back, for example, by a shaped reflective surface and/or a reflective coating adjacent the aperture. The shape of the reflective surface is such as to direct each color of light back to a specific location to maximize the ultimate output light. In one embodiment, the light is directed back from the output side of the housing to an input light source having the same color. In another embodiment the light is directed back from the output side of the housing to a coating on the input side of the light pipe designed to reflect that color light. The reflected light is then reflected back toward the output aperture and a portion of that reflected light is again reflected toward the input and impacts the original source for that color light. In this way, the light (at least in theory) recycles infinitely, thereby increasing the total light output of the housing. In some embodiments, the light is recycled using polarization and in some embodiments the input light is collimated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 1A through 1D illustrate recycling light using a light pipe in accordance with one embodiment of the invention;

FIGS. 6B through 6E show various arrangements of input light colors for use with the embodiment shown in FIG. 6A; and FIG. 7 shows one embodiment of the device of FIG. 1A, 5 or 6A being used in a projection system.

DETAILED DESCRIPTION OF THE INVENTION

Figure 2:
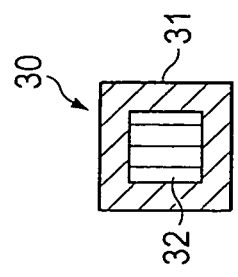
FIG. 2 shows one embodiment of an arrangement of coatings on the input surface for use in the embodiment shown in FIGS. 1A through 1D.

FIG. 1A shows one embodiment 10 in which the outputs of four LEDs, only two of which (such as LED 13 and LED 14) are shown, are combined using straight light pipe 11 to produce single output 110. Input face 15 of light pipe 11 is divided into four quadrants, as shown in FIG. 2. The subdivisions (in this example, quadrants) are red 20-1, green 20-2, green 20-3, blue 20-4. Any number of subdivisions can be used and any number of colors can be combined. In this embodiment, it is desired to generate white light at the output so red, green and blue are used. Based on the assumption that in order to achieve a white output, a greater amount of green is required than red and blue, an extra green light is used in the pattern. In some situations, extra colors may be added to change the tone of the output, even though white light is desired.

Returning to FIG. 1A, assume that LED 13 is a red LED then the output from LED 13 would pass through coating 20-1 which (as shown in FIG. 2) is a red coating. The red coating would pass light in the red frequency spectrum, but would reflect green and blue (and any other possible color) light. Similarly, the area opposite the green LED is coated with a transmissive green coating that reflects red and blue light (the "green coating"). The area apposite the blue LED is coated with a transmissive blue coating that reflects red and green light (the "blue coating"). These coating advantageously can be dichroic coatings having a high (perhaps even 100%) transmittance in the transmission band and a high (perhaps 100%) reflectance in the reflection band. The light then enters the light pipe through an aperture. The light pipe can be constructed from glass or plastic or any other appropriate material and can, if desired, be molded.

Figure 3:
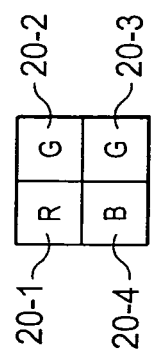
FIG. 3 shows one embodiment of an output surface for use in the light pipes shown in FIGS. 1A through 1D.

Output end 12 of the light pipe, in this embodiment, is a spherical surface, convex in one embodiment, with its center of curvature located on a centerline with the center of the light pipe's input face 15. Optional reflective coating 31 (also shown in FIG. 3) partially covers output face 12 if recycling is used. Light is coupled out of the pipe through uncoated area 32 (also shown in FIG. 3), where an optional polarizer, as will be discussed with respect to FIG. 5, may also be used for polarization recycling. Note that the output end of the housing can be relatively flat if used in conjunction with and external lens with a partially reflective surface to perform the functions described herein.

When light from one particular LED, such as from LED 13, enters into the light pipe, it passes through coating 20-1 as light beam 101. Part of the light from beam 101 will exit the light pipe through opening 32 forming output beam 110. This part is shown as 101'. Note that we are discussing only light from LED 13. Were we also to be discussing light from green LED 14, then a portion of its light would form the output beam, as would a portion of the light from the blue LED. This, in effect, would make the output beam white.

For ease of discussion, however, we will discuss only the light from red LED 13. Thus, as shown in FIG. 1A, a portion of beam 101 reflects (recycles) from output surface 31 back toward input surface 15 as beam 102. The shape of surface 31 is such that the beam from LED 13 (red) is focused on coating 20-3 (green) in the diagonally opposite quadrant from the input light source on account of the spherical profile of the light pipe output face. Since the coating is designed, as discussed above, to reflect all but green spectrum light, beam 102 (as will be discussed below) is reflected back toward output surface 12. Note that, as long as the length of the light pipe is much larger than its transverse dimensions, the recycled ray will hit the point in the input face that is nearly diagonally opposite from the source point from which the ray is originated. The device is constructed so that coatings in opposite quadrants have mutually exclusive transmission spectrums, thus recycled light will be reflected again by that coating and then makes its second forward trip toward the output. As shown in FIG. 1A, beam 102 is making its first (odd numbered) backward trip and thus reflects from the coating. As will be seen, when the beam makes its second backward trip (even numbered) the recycled light will pass through the coating on the input face and reflect from the LED surface from which it was originally generated. In other words, it takes two round trips for the light to get back to its starting position and in general this two-round-trip process keeps repeating itself for infinite number of times.

Turning now to FIG. 1B, note that the beam has been reduced to a ray for easier visualization. Thus, ray 101 has reflected from surface 31 as ray 102, which in turn has reflected from coating 20-3 (as discussed above) and has become ray 103, shown moving toward surface 31 of the output. Some portion 103' of ray 103 passes out of the pipe and combines with output beam 110.

In FIG. 1C, a portion 104 of beam 103 is shown reflecting from surface 31 and passing through coating 20-1 and reflecting from LED 13. As discussed above, this is the second (or even) backward round-trip of the red beam.

In FIG. 1D, ray 105 which has been reflected from LED 13 is shown combined with ray 101 and moving toward the output of the light tube. A portion of the combined 101 and 105 rays passes out of the tube to form beam 110, which a portion of beams 105 and 101 are again reflected back toward green coating 20-3 and the recycling continues to build intensity. This process continues for not only the red beam but simultaneously for all the other beams, thereby producing an enhanced output light beam passing through aperture 32.

This concept can be extended to M×N LED chip arrays, where both M and N are even integers. The only requirement on the LED configuration is that LEDs that are diagonally opposite to each other must be of different emission wavelengths so that the corresponding coatings will have different transmission bands.

The light sources of course do not have to be LEDs. The concepts discussed herein can also work with lasers or with any other illumination device.

Figure 4:
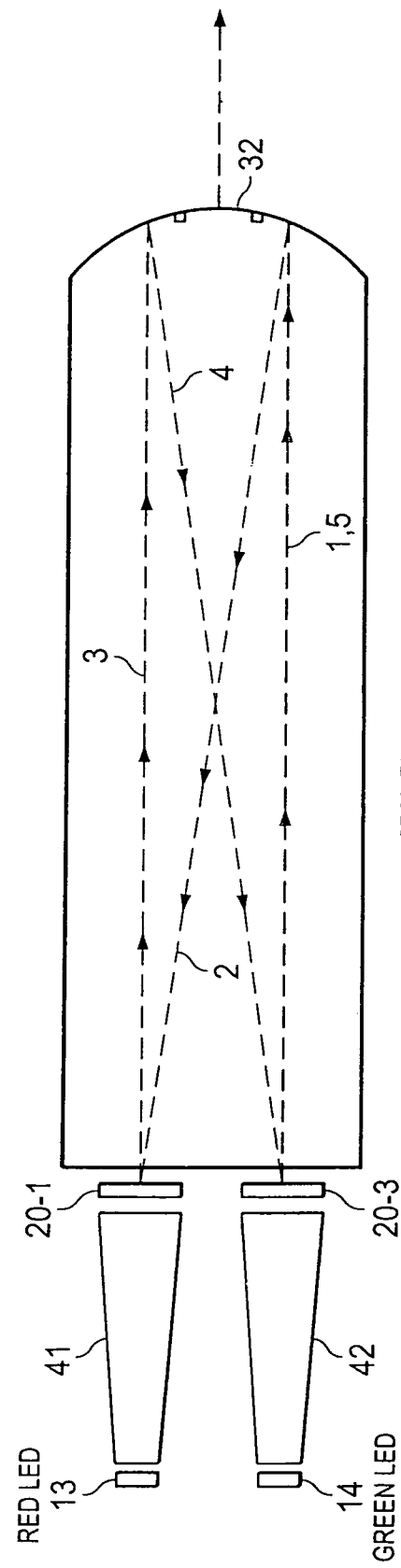
FIG. 4 shows one embodiment of the concepts being extended to include tapered light pipes.

FIG. 4 shows the concept being extended to include tapered light pipes 41 and 42 (the other two for a four LED system not being shown). The output surfaces of the tapered light pipes serve as "virtual sources" for the ensuing multiplexing light pipe. The tapered light pipes also serve as light guides for guiding the recycled light to the correct LED. Thus, the "diagonally opposite points" are defined on the "virtual sources", i.e., the output faces of the tapered light pipes. Both the radius of curvature and the exact profile of the output faces of the multiplexing light pipe need to be optimized for best performance so as to image one input light source onto its proper diagonally opposite counterpart light source. In some situations, the output surface profile need not be spherical so long as the concepts discussed herein are achieved.

The set of tapered light pipes serve to collimate the LED source light and their output apertures serve as a set of "virtual sources" for the subsequent multiplexing light pipe. It can be shown that the multiplexing light pipe works better with collimated light and the requirement for a long light pipe ("long" compared to its transverse dimensions) can be more or less relaxed depending on the extent of collimation.

Figure 5:
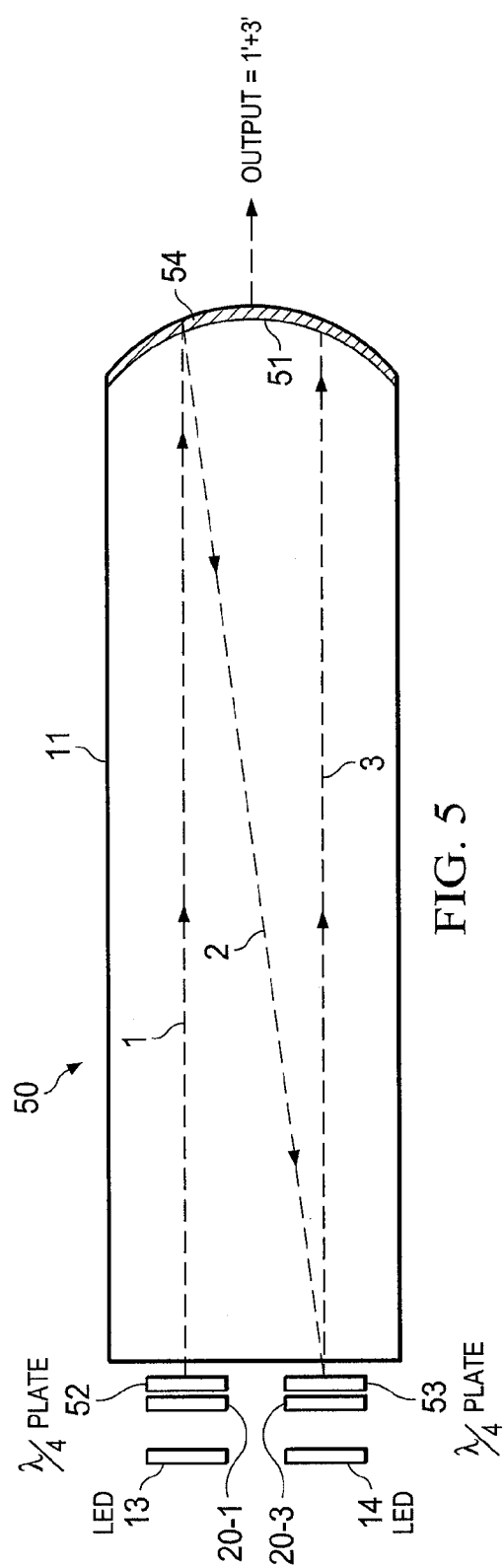
FIG. 5 shows a preferred embodiment in which a polarization recycling light pipe is used.

FIG. 5 shows preferred embodiment 50 in which a polarization recycling light pipe is used, e.g., by not covering output face 51 with a reflective coating, but instead covering it entirely with polarizer 54. The polarizer can come either in the form of a polarizer grating or a separate polarizing plate that is glued/bonded onto the output window of the light pipe.

At the input end of the light pipe, a set of quarter wave plates ($\lambda/4$) 52 and 53 are inserted between color coatings 20-1 and 20-3 and the input of multiplexing light pipe 11 for rotating the polarization of the recycled light. Since the input light from the light sources is generally randomly polarized, it would pass through the quarter-wave plates with no change to its polarization state. This light then impacts output side 51 of light pipe 11 and polarizing filter 54 allows approximately ½ of the light to exit the pipe. The other half is recycled back to the input side of the pipe to a diagonally opposite location from where it began. The light then passes through the ¼ wave filter and reflects from the different colored coating. This reflected light then again passes through the ¼ wave plate for a total polarization rotation of 90 degrees. In this way, 50% of the light passes through polarizer 54 during the first forward trip and 50% gets reflected back and passes through polarizer 54 on its second forward trip out (after being recycled once). In this manner, each lumen/photon either goes straight out of the pipe or is recycled once. As a result, 100% recycling efficiency is achieved in theory. This theoretically limit of 100% recycling efficiency is of course only achievable under a set of ideal assumptions: the light pipe is infinitely long, the incident beam is 100% collimated and runs parallel to the optical axis (so the two polarization directions are well defined). Hence, the tapered light pipes shown in FIG. 4 will be useful. However, even if the set of stringent requirements are relaxed, the configurations discussed herein achieve relatively high recycling efficiency.

Figure 6A:
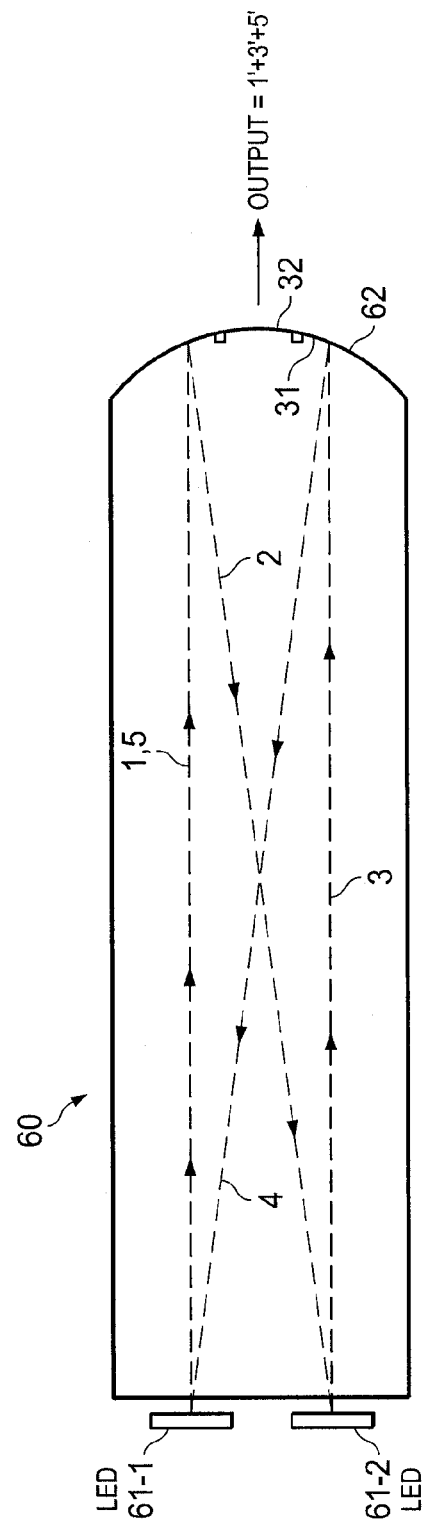
FIG. 6A shows an alternate embodiment where the light is directed back from the output side of the housing to an input light source having the same color.

FIG. 6A shows alternate embodiment 60 where the light from an input light source, such as LED source 61-1 is directed back from output side 62 of the housing to an input light source, such as LED 61-2 having the same color as light source 61-1. Note that the recycling from output side 62 can be accomplished in many ways, for example by the aperture and reflective surface shown in FIG. 3 and by the polarization structure shown in FIG. 5. Of course, proper heat sinks and other control equipment, not shown, would be required as it would be for any of the embodiments.

FIGS. 6B through 6E show various light pattern arrangements for use with housing 60, shown in FIG. 6A. Note that any number of light colors can be used, provided that the light from any particular color reflects back to its own color. To say this another way, the recycled light in this embodiment is imaged back onto an input light source (LED in this example) having the same color as the originating color for that ray. This is in contrast to the embodiment shown in FIG. 1A where the light from the housing output is imaged back onto a coating associated with a different light color. In most situations, using the coatings for reflection, as discussed with respect to FIGS. 1A through 1D will yield a higher light output. Note that in the embodiment shown in FIG. 1A a portion of the input light is reflected from the output to a diagonally opposite section of the input face having a different colored source light with re-reflection occurring under control of the coating having a transmission band of a different color, while in the embodiment of FIG. 6A the diagonally opposite input light is of the same color and thus re-reflection is caused by the surface of the input source light which are LEDs in the embodiments shown.

FIG. 7 shows one embodiment of device 10 of FIG. 1A or device 50 of FIG. 5 being used in a projection system, such as system 70. Note that in FIG. 7 heat sink 71 has been shown. This heat sink, while not shown in FIG. 1A or 5 could be necessary, depending on the LED structure employed. Light output from device 10 (or 50) passes through relay lens 72 for use in projector engine 73. Typically the projector will have one or more projection lenses 75 and output focuser 74 can be DLP, LCOS or any other format. In such use, the output light from the light pipe should be white.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In combination a light pipe and at least four input light sources emitting at least two different colors of light;
    wherein said light pipe comprises an input end, an output end, and a center axis extending between said input end and said output end;
    wherein said output end has a concave surface facing said input end and which is centered about said axis;
    wherein a center portion of said output end, surrounding said axis, is uncoated to allow light to pass therethrough;
    wherein the remaining portion of said output end has a reflective surface to recycle light beams which impact such reflective surface back towards said input end;
    wherein said input light sources are located proximate said input end for emitting light into said light pipe and are arranged in an array centered about said axis; and
    wherein said light pipe is dimensioned such that light rays emitted from each light source which impact said reflective surface are reflected back to a light source lying directly on the opposite side of the center axis.

2. The light pipe of claim 1, wherein rays emitted by at least one light source are reflected back onto an input light source of a same color.

3. The light pipe of claim 1, wherein a first light source of said at least four input light sources is a red LED, a second light source of said at least four input light sources is a green LED, and wherein a third input light source of said at least four input light sources is a blue LED and wherein light from said first, second and third input light sources combine under control of said output to provide white output light.

4. The light pipe of claim 3 wherein said fourth input light source is a duplicate color of one of said first, second or third input light sources and wherein light from said first, second, third and fourth input sources combine under control of said output to provide white output light.

5. The combination of claim 1, further comprising a reflector element positioned between each said light source and said input end, each said reflector element passing light of the same color as emitted by said light source and reflecting light of any other color.

6. The light pipe of claim 5, wherein light rays emitted by at least one light source are reflected back onto an input light source of a different color.

7. A projector comprising: a projector engine and a light source, said light source comprising a light pipe and at least four input light sources emitting at least two different colors of light;
    wherein said light pipe comprises an input end, an output end, and a center axis extending between said input end and said output end;
    wherein said output end has a concave surface facing said input end and which is centered about said axis;
    wherein a center portion of said output end, surrounding said axis, is uncoated to allow light to pass therethrough;
    wherein the remaining portion of said output end has a reflective surface to recycle light beams which impact such reflective surface back towards said input end;
    wherein said input light sources are located proximate said input end for emitting light into said light pipe and are arranged in an array centered about said axis; and wherein said light pipe is dimensioned such that light rays emitted from each light source which impact said reflective surface are reflected back to a light source lying directly on the opposite side of the center axis.

8. The projector of claim 7, further comprising a reflector element positioned between each said light source and said input end, each said reflector element passing light of the same color as emitted by said light source and reflecting light of any other color.

9. The projector of claim 8, wherein rays emitted by at least one light source are reflected back onto an input light source of a different color.

10. The projector of claim 7, wherein light rays emitted by at least one light source are reflected back onto an input light source of a same color.

* * * * *